United States Patent [19]

Korn et al.

[11] 4,300,135

[45] Nov. 10, 1981

[54] SEISMIC ALARM SYSTEM

[76] Inventors: Lawrence D. Korn, 17615 Adrian Rd., Southfield, Mich. 48075; Erik D. Goodman, 101 Rampart Way, E. Lansing, Mich. 48823; Charles R. MacCluer, 9970 Winegar, Laingsburg, Mich. 48848

[21] Appl. No.: 50,671

[22] Filed: Jun. 21, 1979

[51] Int. Cl.³ .................. G08B 21/00; G01V 1/18
[52] U.S. Cl. .................. 340/690; 33/1 HH; 73/594; 73/652; 181/122; 367/135; 367/181
[58] Field of Search .......... 340/566, 669, 683, 690; 367/135, 176, 181, 191, 912; 181/122; 73/594, 652; 33/1 HH

[56] References Cited

U.S. PATENT DOCUMENTS

| | | | |
|---|---|---|---|
| 1,611,749 | 12/1926 | Himmelman | 340/566 |
| 2,423,864 | 7/1947 | Washburn et al. | 73/652 X |
| 2,638,578 | 5/1953 | Piety | 367/181 |
| 2,771,592 | 11/1956 | Edmonson | 367/181 |
| 2,935,582 | 5/1960 | Northey | 200/83 |
| 3,506,957 | 4/1970 | Davison | 340/690 X |
| 3,683,353 | 8/1972 | Miller | 200/61.51 X |
| 3,714,456 | 1/1973 | Krohmer et al. | 367/135 X |
| 3,949,353 | 4/1976 | Waters et al. | 340/690 X |
| 4,028,659 | 6/1977 | Rihn | 340/566 X |
| 4,069,405 | 1/1978 | Fine | 200/84 C |
| 4,121,200 | 10/1978 | Colmenero | 340/539 |
| 4,124,841 | 11/1978 | Kittunen | 340/690 |

FOREIGN PATENT DOCUMENTS 43-478511  7/1968  Japan ................. 340/690

*Primary Examiner*—John W. Caldwell, Sr.
*Assistant Examiner*—Joseph E. Nowicki
*Attorney, Agent, or Firm*—Gifford, VanOphem, Sheridan & Sprinkle

[57] ABSTRACT

An alarm system is provided for detecting a seismic tremor and for generating an audio and/or visual alarm signal which varies depending upon the magnitude of the seismic tremor. In the preferred form of the invention, the alarm system comprises a free running oscillator having a pair of terminals the capacitive value across which controls the frequency of the oscillator. A fixed oscillator plate is electrically connected to one terminal while a variable position oscillator plate is electrically connected to the other terminal and has an inertial mass secured to it. A spring positioned between the plates urges the variable position capacitor plate away from the fixed plate but still enables the variable position capacitor plate to move in response to a seismic tremor thus varying the capacitive value between the terminals and the frequency of the oscillator. The output from the oscillator is coupled through a phase locked loop circuit which tracks the oscillator output. The output from the phase loop lock circuit is fed to a signal conditioner which shapes the amplitude response and in addition provides continuous recalibration to a zero output level when the device is unperturbed. The output from the signal conditioner in turn is coupled to an event classifier which compares the output signal from the signal conditioner with at least two preset reference levels. When the signal from the signal conditioner exceeds a first preset reference level, the event classifier activates a first alarm signal. When the output signal from the signal conditioner exceeds a second preset reference signal, the event classifier activates a second alarm signal.

17 Claims, 6 Drawing Figures

U.S. Patent    Nov. 10, 1981    Sheet 1 of 2    4,300,135
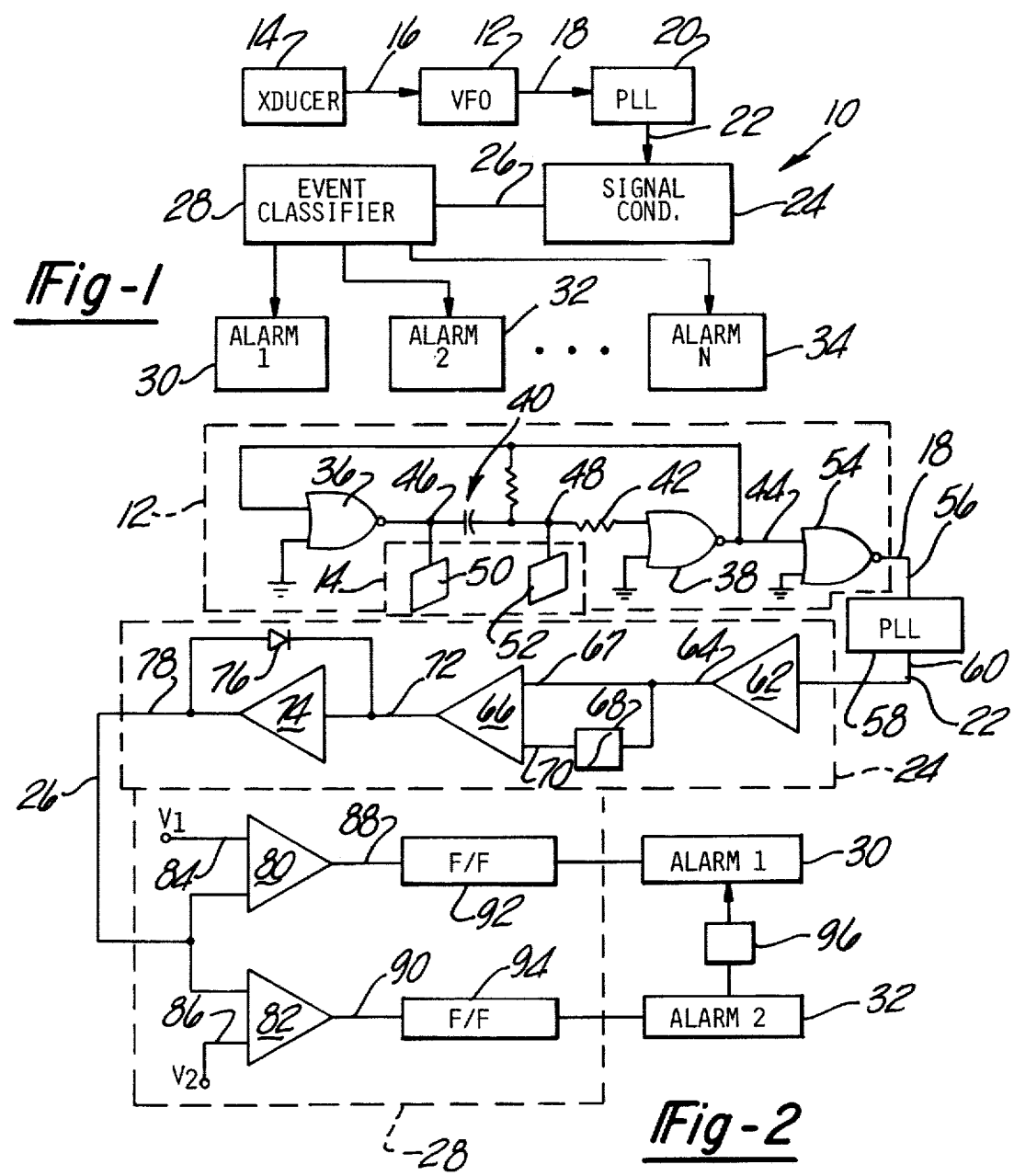
Fig-1
Fig-2
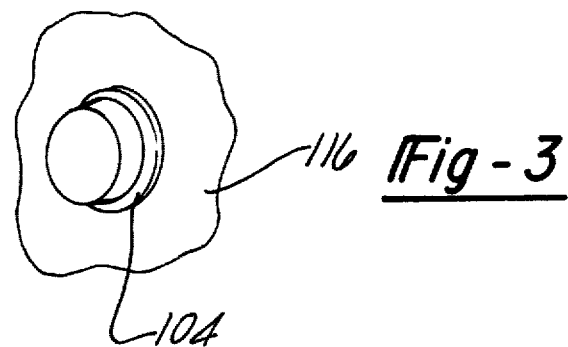
Fig-3

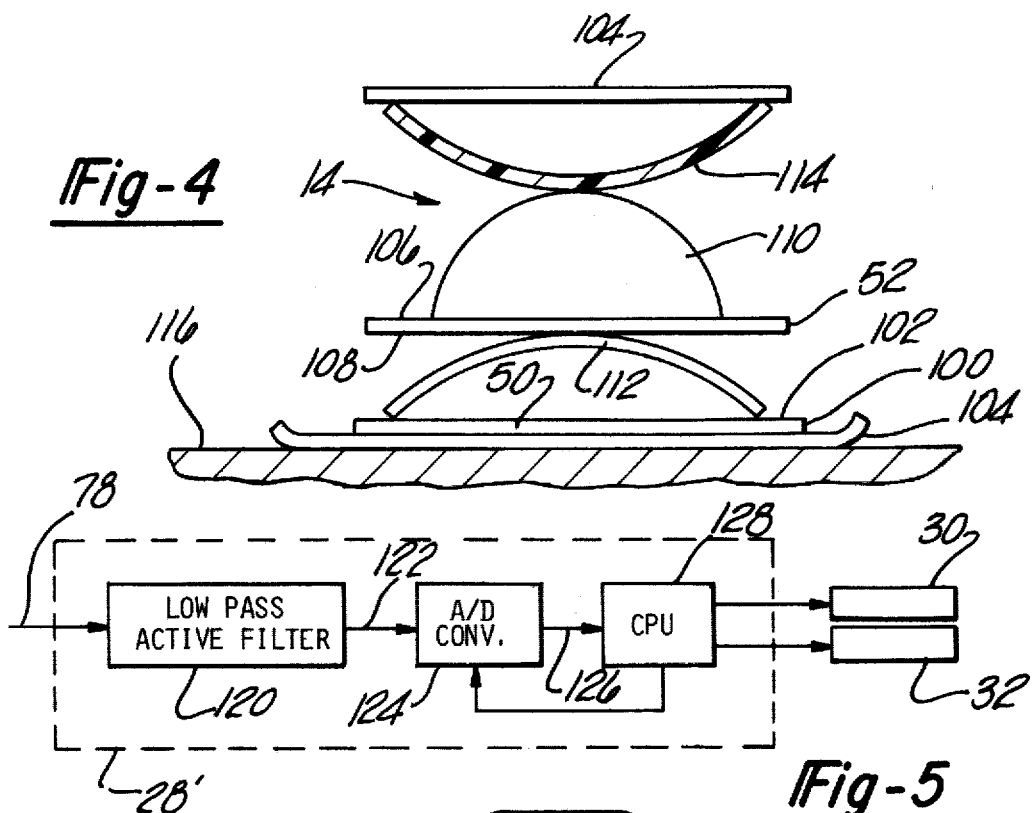
*Fig-4*
*Fig-5*
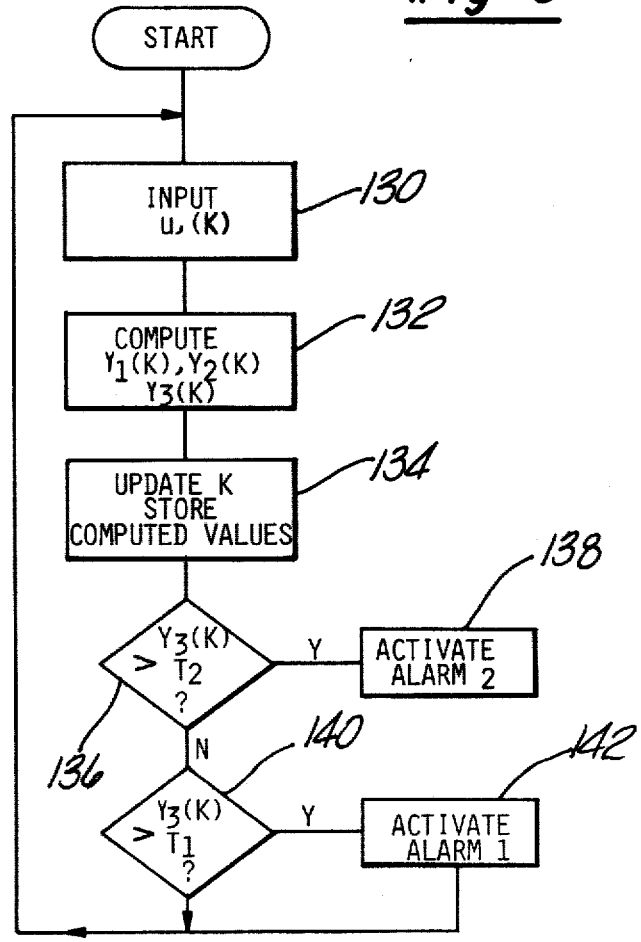
*Fig-6*

4,300,135

SEISMIC ALARM SYSTEM

BACKGROUND OF THE INVENTION

I. Field of the Invention

The present invention relates generally to alarm systems and, more particularly, to an alarm system which detects seismic tremors.

II. Description of the Prior Art

At present, no accurate means exists for pinpointing in advance either the time and place of earthquake activity. Earthquake shocks are sequential in nature with the typically more destructive S and L waves following the fast moving but less severe P waves by several seconds when in very close proximity to the epicenter of the earthquake. At more distant locations from the epicenter of the earthquake, the P waves may precede and S and L waves by several minutes.

The greatest danger to human life during earthquake activity is the collapse of building structures while persons are entrapped within them. However, since the less severe P waves of the earthquake precede the more severe S and L waves, there is often sufficient time available for persons to enhance their personal safety, for example by leaving the building structure, avoiding windows, and the like. Unfortunately, many people either do not perceive that an earthquake is in progress, or require some objective confirmation before taking appropriate action; thus, their response may be delayed until the more severe earthquake shocks, i. e. the S and L waves, have already begun.

There have, of course, been a number of previously known seismic graphs for detecting and oftentimes recording intensities of seismic tremors. One type of previously known device, however, is generally complex and expensive in construction and, therefore, economically unsuitable for home or personal use. On the other hand, other types of previous known devices do not distinguish or provide separate alarms indicative of the intensity of the tremor.

SUMMARY OF THE PRESENT INVENTION

The present invention overcomes the above mentioned disadvantages of the previously known devices by providing an inexpensive and yet totally effective device for detecting seismic tremors and for generating an audio and/or visual alarm signal which varies depending upon the magnitude of the seismic tremor.

In the preferred form of the invention, the device according to the present invention comprises a free running oscillator having a pair of terminals the capacitive value across which controls the frequency of the oscillator. A fixed capacitor plate is electrically connected to one of these terminals while a variable position capacitor plate is connected to the other terminal. An inertial mass is secured to the variable position capacitor plate while resilient means urges the variable position capacitor plate away from the fixed position capacitor plate.

The entire device itself is contained within a housing which is rigidly secured to a building structure. Motion of the building structure caused by an earthquake is in turn transmitted to the device housing and thence to the fixed position capacitor plate. However, the variable position capacitor plate, by virtue of the inertia of the mass secured to it, tends to remain fixed in space. Thus, the movement of the fixed position capacitor plate is translated into a change in the separation between the two plates. This change in capacitance varies the frequency of the free running oscillator.

The output from the oscillator is fed to an input of a phase lock loop (PLL) circuit or PLL discriminator having an error voltage output the magnitude of which is indicative of the frequency deviation of the oscillator. The PLL discriminator, in contrast to other types of discriminators, is inherently self-calibrating, so that its discrimination function is insensitive to the alignment of the housing, supply voltage, component drift, and other long term variations which influence the frequency of the oscillator. However, the DC component of the error voltage is still affected by the above mentioned factors.

The output from the PLL discriminator in turn is fed to a signal conditioning means which shapes the output signal from the PLL discriminator. In particular, the signal conditioning means includes first, an integrating amplifier which removes the remaining DC drift induced by the previously mentioned factors. Second, the signal conditioning means includes an operational amplifier with logarithmic amplitude response which compresses the amplitude range of the signal.

The output from the signal conditioner in turn is fed to an input of an event classifier which compares the signal conditioner output with preset reference levels. When the magnitude of the output signal from the signal conditioner exceeds a first predetermined reference level, the event classifier sets a latch and activates a first audio and/or visual alarm. Preferably, the first reference signal will be of a magnitude corresponding to relatively low magnitude P waves resulting from earthquake activity.

Similarly, when the output signal from the signal conditioner exceeds a second predetermined reference level greater than the first reference level, the event classifier sets a further latch which in turn activates a second audio and/or visual alarm. The second reference signal will correspond to tremors resulting from more powerful S and L waves of earthquake activity, or from P waves of activity of nearer origin. The first and second alarms, of course, differ from each other.

In operation, movement transmitted to the device housing from a seismic tremor in turn moves the variable position capacitor plate relative to the fixed plate. This movement in turn varies the frequency of the oscillator and, in effect, generates FM side bands utilizing the oscillator frequency as the carrier frequency. The FM side bands are detected by the PLL discriminator which generates an error voltage as an input to the signal conditioner.

The error voltage output from the PLL discriminator is fed through and conditioned by the signal conditioner and the output from the signal conditioner is fed as an input to the event classifier. The event classifier compares this signal with its reference voltages. If the output signal from the reference voltages exceeds the first reference signal, indicative of a minor tremor, the event classifier activates the first alarm. This early warning would thus permit persons to seek a safer area prior to any subsequent, and perhaps more severe, earthquake activity. Similarly, the event classifier will activate the second alarm in the event of a more severe shock and provide an alarm signal that persons must immediately seek a safer area prior to the subsequent and sequential earthquake tremors.

BRIEF DESCRIPTION OF THE DRAWING

A better understanding according to the present invention will be had upon reference to the following detailed description when read in conjunction with the accompanying drawing, wherein like reference characters refer to like parts throughout the several views, and in which:

FIG. 1 is a block diagrammatic view illustrating the seismic alarm system according to the present invention;

FIG. 2 is a partial schematic view illustrating the alarm system according to the present invention;

FIG. 3 is a fragmentary perspective view illustrating the alarm system according to the present invention secured to a building structure;

FIG. 4 is a sectional side view illustrating the electromechanical sensor means for detecting seismic tremors;

FIG. 5 is a block diagrammatic view illustrating a more sophisticated modification of a portion of the seismic alarm system according to the present invention; and FIG. 6 is a flow chart illustrating the programming steps for the modification of the invention depicted in FIG. 5.

DETAILED DESCRIPTION OF THE PRESENT INVENTION

With reference first to FIG. 1, a block diagrammatic view illustrating the seismic alarm system 10 according to the present invention is thereshown. Although many of the individual blocks of the diagram illustrated in FIG. 1 will be hereafter described in greater detail, in general, the device 10 comprises a variable frequency oscillator 12 having a motion sensitive capacitive transducer 14 coupled to it. Vibration of the capacitive transducer 14 in turn generates an output signal along line 16 which frequency modulates the oscillator 12 and this frequency modulated signal is fed along line 18 to an input of a phase lock loop (PLL) discriminator 20.

In the well known fashion, the discriminator 20 provides an error voltage output signal along line 22 which varies proportionately with the magnitude of the frequency deviation of its input signal from line 18 and thus varies with the magnitude of motion detected by the capacitive transducer 14. This output 22 from the discriminator 20 in turn is fed as an input signal to a signal conditioner 24 which shapes and conditions the signal from the discriminator 20. The signal conditioner 24 provides an output signal along line 26 as an input signal to an event classifier 28.

The event classifier 28 compares the input singal 26 from the signal conditioner 24 with preset and predetermined reference voltages representative of seismic tremors of different magnitudes. Thus, for example, when the input signal to the event classifier 28 exceeds a first predetermined reference level, indicative of a minor tremor, the event classifier 28 will activate a first audio and/or visual alarm 30. Similarly, when the input signal to the event classifier 28 is of a greater magnitude, indicative of a more severe seismic tremor, the event classifier 28 will activate a second audio and/or visual alarm 32 which differs from the first alarm 30 so that the alarms 30 and 32 can be easily differentiated. Any number of different alarms, as indicated by alarm N 34 can be connected to the event classifier 28.

With reference now to FIG. 2, a more detailed schematic diagram of the oscillator 12, signal conditioner 24 and event classifier 28 is thereshown. The oscillator 12 comprises a pair of inverters 36 and 38 (illustrated as NOR gates having one input grounded) and wherein the output from the inverter 38 is connected as an input to the inverter 36. The output from the inverter 36 in turn is connected through a capacitor 40 and resistor 42 to the input of the inverter 38 so that the inverters 36 and 38 together form a free running clock having an output 44. Moreover, the frequency of the free running clock or oscillator 12 is dependent upon the capacitive value across circuit nodes 46 and 48 and across which the capacitor 40 is connected. The output signal 44 from the free running clock is connected to the input of an inverter 54 to provide isolation for the oscillator 12.

Still referring to FIG. 2, the capacitive transducer 14, which will be subsequently described in greater detail, generally comprises a fixed capacitor plate 50 connected to the circuit node 46 and a variable position capacitor plate 52 connected to the circuit node 48. The separation distance between the capacitor plates 50 and 52 controls in conjunction with the capacitor 40 the capacitive value between the circuit nodes 46 and 48 and thus the frequency of the oscillator 12.

The output 56 from the inverter 54 forms the clock output 18 and is connected to an input of a phase lock loop (PLL) discriminator 20 having an error voltage output 60 which varies in magnitude in an amount proportional to the frequency deviation of its input signal. PLL discriminators, however, are well known in the art (for example, RCA Part No. CA-4046) so that further description of them is unnecessary. The discriminator 20 will moreover track its input signal for long term variations of the oscillator frequency caused by changes in the component values through age, orientation of the device 10, and the like.

Still referring to FIG. 2, the signal conditioner 24 is also illustrated in greater detail and includes an operational amplifier 62 which receives as its input signal the output signal on line 22 from the discriminator 58. The amplifier 62 provides isolation for the signal conditioner 24 from the discriminator 20.

The output 64 from the amplifier 62 in turn is fed to one input 67 of a differential amplifier 66 and also as an input to an integrator 68. The output from the integrator 68 in turn is connected to the other input 70 of the differential amplifier 66. Thus, the voltage on the first input 67 of the differential amplifier 66 is representative of the instantaneous voltage output from the discriminator 58 while the signal connected to the other input 70 of the differential amplifier 66 is representative of the average error signal from the discriminator 58. The integrator 68 in conjunction with the differential amplifier 66 thus serves to attenuate steady state and extremely low frequency signal variations that can be caused by mounting orientation of the device, steady state changes in the parameters of the capacitive transducer 14 and/or the oscillator 12, and the like.

The output 72 from the differential amplifier 66 in turn is fed as an input signal to a further operational amplifier 74 with a diode 76 connected feedback. The amplifier 74 with its diode feedback logarithmically compresses its input signal from differential amplifier 66 and provides this compressed signal on its output 78 on line 26.

Still referring to FIG. 2, the output 78 from the signal conditioner 24 is connected as an input to the event classifier 28 which compares this signal with preset reference voltages and selectively activates the alarms 30 and 32. As shown in FIG. 2, the output 78 from the signal conditioner 24 is fed as one input to a pair of voltage comparators 80 and 82. A reference voltage V1 is connected to the other input 84 of the comparator 80 while, similarly, a reference voltage V2 is connected to the other input 86 of the voltage comparator 82. The reference voltage V1 is indicative of a voltage level that would be generated on the output 78 from the signal conditioner 24 corresponding to a relatively minor seismic tremor and, in this event, the comparator 80 would generate a signal on its output 88. Similarly, the reference voltage V2 corresponds to the voltage level from the signal conditioner 24 corresponding to a major seismic tremor and, in this event, the comparator 82 would generate an output signal along its output 90.

The output 88 from the first comparator 80 in turn is connected to a flip-flop 92, or latch, and thus activates the alarm 30. Similarly, an output signal on the comparator output 90 is connected to an input of a second flip-flop 94 which activates the second alarm 32. In addition, a lockout circuit means 96 is preferably provided to disable the first alarm 30 whenever the second alarm 32 has been activated. A conventional reset means (not shown) is provided to reset the flip-flops 92 and 94.

The alarms 30 and 32 are distinct from each other so that these alarms can be rapidly distinguished from each other. For example, the first alarm 30 could constitute a beeping tone while the alarm 32 could comprise a variable frequency siren type tone. Any conventional electrically actuated alarm can be used for the alarms 30 and 32 while remaining within the scope of the invention so that a further description of these alarms is unnecessary.

With reference now to FIG. 4, the capacitive transducer 14 is thereshown in greater detail in which the fixed capacitor plate 50 comprises a printed circuit (PC) board 100 having a foil side 102 and secured on its other side to a housing 104 for the device 10. The variable position capacitor plate 52 also comprises a PC board 106 having a foil side 108 and an inertial mass 110, such as a lead weight, secured to its other side.

The PC board 106 is contained within the housing 104 in a position generally parallel to but spaced from the first PC board 100 but, unlike the PC board 100, the PC board 106 is not secured to the housing 104. Rather, a spring 112, preferably an arcuately formed sheet of resilient plastic, is positioned in between the PC boards 100 and 106 to space and electrically insulate the capacitor plates 50 and 52. In addition, a further arcuately formed sheet of resilient plastic 114 is preferably positioned between the housing 104 and the inertia mass 110 so that the second PC board 106 with its inertia mass 110 is suspended within the interior of the housing 104.

With reference now particularly to FIGS. 3 and 4, the device housing 104 in turn is connected to a member 116, such as a wall, of a building structure. Since the device housing 104 is secured to the building structure, in the event of movement of a building structure caused by earthquake activity, the device housing 104 with its fixed capacitor plate 50 will vibrate or shift while, conversely, the variable position capacitor plate 52 will tend to remain stationary due to its inertia weight 110. Such a motion will vary the distance, and thus the capacitive value, between the capacitor plates 50 and 52 in the well known fashion and likewise vary the frequency of the oscillator 12. As should be apparent, the greater movement of the building structure in turn causes a greater variation between the capacitor plate spacing and thus the magnitude of variation of the capacitive value.

Although the operation of the device 10 according to the present invention should by now be apparent, it will be briefly summarized with reference to FIGS. 1 and 2, in the interest of clarity. Assuming that the device itself is stationary and that no earthquake activity is present, the distance between the capacitor plates 50 and 52 remains constant so that the output 44 from the oscillator 12 is likewise constant. Since the input frequency to the PLL discriminator 58 is constant, its error voltage output 60 remains substantially constant and the output 78 from the signal conditioner 74 is substantially zero. The input signal to the voltage comparators 80 and 82 in the event classifier 28 is thus less than either V1 or V2 and neither of the comparators 80 or 82 will generate an output signal to activate the alarms 30 or 32.

Assuming now that a relatively minor seismic tremor, such as typically would occur from a low intensity P wave, acts upon the building structure 116 to which the device 10 is attached, the capacitor spacing between the capacitor plates 50 and 52 will vary in an amount proportional to the magnitude of the tremor and thus vary the capacitive value between the nodes 46 and 48 as has been previously described. This in turn generates a frequency modulated signal at the output 18 of the oscillator 12 which the discriminator 20 detects and generates an error signal output 60 of a magnitude proportional to the magnitude of the frequency variation. The error voltage output from the discriminator 20 is processed by the signal conditioner 24 in the previously described fashion and the conditioned and compressed signal is fed to the inputs of the comparators 80 and 82. Since the seismic tremor is a relatively minor tremor, the value of the signal on the output 78 from the signal conditioner 24 is greater than the reference voltage V1 but less than the reference voltage V2. Consequently, the comparator 80 is activated which sets the flip-flop 92 and activates the first alarm 30.

In the event that the seismic tremor is of a greater magnitude, however, the output signal on line 78 from the signal conditioner 24 is greater than both the reference voltages V1 and V2 so that both of the comparators 80 and 82 generate an output signal along their respective output lines 88 and 90. In this event, the second alarm 32 is activated while, simultaneously, the first alarm 30 is disabled by the lockout circuit means 96.

With reference now particularly to FIGS. 5 and 6, a more sophisticated event classifier 28' is thereshown which attenuates certain types of structural vibration in the building structure as being of nonseismic origin. For example, in the event that a building has heavy machinery which induces a periodic vibration in the building of a frequency of about ten Hertz, it would be desirable to attenuate a signal frequency between about nine and eleven Hertz from the signal conditioner to prevent unintentional activation of the alarm system. It will be understood, of course, that the ten Hertz figure is exemplary only and that a number of different periodic vibrations may be characteristic in any given building structure which are not indicative of seismic tremors.

For the example given, a signal $U_1$ from the signal conditioner output line 78 is first fed into a low pass active filter to restrict the incoming signals to those of interest, for example, zero to forty Hertz, to prepare the signal for sampling. The output 122 from the low pass active filter 120 is then fed to an analog/digital (A/D)

convertor 124 which generates a digital signal at its output 126 to a microprocessor 128.

The microprocessor 128 with its A/D convertor 124 forms a digital filter programmed specifically to attenuate signals only in the ten Hertz range. For example, assuming a sample rate of 200 samples/second, i.e. a sampling interval T of 0.005 seconds, the equations to be executed by the microprocessor 128 to attenuate the ten Hertz vibration are as follows:

$$y_1(k) = u_1(k) - 1.902113033\, u_1(k-1) + u_1(k-2)$$
$$= 1.883647214\, y_1(k-1) - .9905386848\, y_1(1-2)$$

$$y_2(k) = y_1(k) - 1.902113033\, y_1(k-1) + y_1(k-2)$$
$$+ 1.872234711\, y_2(k-1) - .9688308136\, y_2(k-2)$$

$$y_3(k) = y_2(k) - 1.920113033\, y_2(k-1) + y_2(k-2)$$
$$+ 1.902113033\, y_3(k-1) - .9905386849\, y_3(k-2)$$

Where $y_3(k)$ = the filtered signal.

The filtered signal $y_3(k)$ is then compared against the threshold values $T_1$ and $T_2$ in order to activate the alarms 30 and 32 in the previously described fashion.

FIG. 6 illustrates an algorithm for the microprocessor 128. At step 130, the microprocessor 128 inputs the input signal $u_1(k)$ as its input data. At step 132, the microprocessor 128 computes the values of $y_1(k)$, $y_2(k)$ and $y_3(k)$ in accordance with the above listed equations. At step 134 the microprocessor 128 updates k for the next sample then stores various computed values necessary to perform the operations in step 132.

At step 136 the microprocessor 128 compares the filtered signal $y_3(k)$ with the second or greater threshold $T_2$ and, if greater, activates the second alarm 32 as indicated at step 138. If the filtered signal $y_3(k)$ is not greater than $T_2$, the microprocessor 128 then compares the filtered signal $y_3(k)$ with the first and smaller threshold value $T_1$ at step 140. If the filtered signal $y_3(k)$ is greater than $T_1$, the first alarm 30 is activated as indicated at step 142 and the program control is again returned to 130. If the filtered signal $y_3(k)$ is less than $T_1$, as would occur in the absence of a seismic tremor, program control is again returned to step 130 and the process is repeated.

Alternatively, of course, the microprocessor could be programmed to recognize a wave pattern or signature of an earthquake.

For a more complete description of digital filters, reference should be had, for example, to Discrete-Time Systems by J. A. Cadzow, Prentice-Hall, Englewood Cliffs, N.J. 1973.

The foregoing example, which comprises a digital notch filter, is by no means exhaustive of the scope of signal recognition and/or processing functions which can be performed by the microprocessor 128, but is intended to be illustrative only.

In a more sophisticated embodiment, a microprocessor 128 could receive input signals from a set of three orthogonally mounted accelerometers, each comprised of a capacitive transducer 14, a variable frequency oscillator 12, a phase lock loop discriminator 20 and a signal conditioner 24. This would enable the processor 128 to conduct a true signature analysis on the triple of input signals.

From the foregoing, it can be seen that the alarm system 10 according to the present invention provides a unique, inexpensive and yet totally effective means for detecting a seismic tremor and providing an audio and/or visual alarm signal which varies depending upon the magnitude of the seismic tremor. By providing such an alarm, persons within the building structure are then forewarned to take protective or safety measures such as vacating the building structure and/or staying clear of windows or other hazards.

Having described our invention, however, many modifications thereto will become apparent to those skilled in the art to which it pertains without deviation from the spirit of the invention as defined by the scope of the appended claims.

We claim:

1. A seismic alarm system comprising:
   means for detecting a seismic tremor;
   means responsive to said detecting means for generating a signal proportional to the magnitude of the tremor;
   means for selectively activating one of at least two alarm means in dependence upon the magnitude of said signal and
   wherein said signal generating means comprises an oscillator having an output connected to an input of a phase locked loop circuit means, said phase locked loop circuit means having an error voltage output the magnitude of which is proportional to the instantaneous frequency deviation of the input signal but substantially unaffected by long term frequency variations of the input signal to the phase locked loop circuit means and wherein said detecting means comprises means for varying the frequency of the oscillator proportionately with the magnitude of the seismic tremor.

2. The invention as defined in claim 1, wherein the frequency of the oscillator is dependent upon a capacitive value between two nodes in the oscillator and wherein said means for varying the frequency of the oscillator comprises:
   a fixed capacitor plate connected to one of said nodes;
   a variable position capacitor plate connected to the other node;
   an inertia mass secured to said variable position capacitor plate; and
   means for resiliently urging said variable position capacitor plate away from said fixed position capacitor plate.

3. The invention as defined in claim 2 wherein said resilient urging means comprises an arcuately formed sheet of resiliently insulating material positioned between and abutting against both of said capacitor plates.

4. The invention as defined in claim 2 and further comprising means for resiliently urging said capacitor plates toward each other whereby said variable position capacitor plate is suspended in a spaced apart and parallel relation with respect to the fixed capacitor plate.

5. The invention as defined in claim 1 and including signal conditioning means operatively connected between said error voltage output of the phase locked loop circuit and said activating means for attenuating extremely low frequency components of said signal and amplifying said signal while compressing its amplitude range.

6. The invention as defined in claim 5 wherein said signal conditioning means comprises a differential amplifier having two inputs and a differential output and an integrator having an input and an output, said error voltage output signal being connected to said integrator input and one of said differential amplifier inputs, said integrator output being connected to the other differential amplifier input and said differential amplifier output being connected to said activating means.

7. The invention as defined in claim 1 wherein said selective activating means comprises a microprocessor preprogrammed to compare said signal from said generating means with a predetermined set of wave characteristics and to produce an output signal as a result of said comparison.

8. The invention as defined in claim 1 wherein said selective activating means comprises a digital notch filter.

9. The invention as defined in claim 8 wherein said notch filter comprises a programmed microprocessor.

10. An accelerometer comprising:
    an oscillator having an output and two nodes the capacitive value across which controls the frequency of the oscillator;
    a fixed position capacitor plate connected to one of said nodes;
    a variable position capacitor plate connected to the other node;
    an inertia mass secured to said variable position capacitor plate;
    means for resiliently urging said variable position capacitor plate away from said fixed position plate; and
    a phase lock loop discriminator having an input which is connected to the output of said oscillator, said discriminator having an error voltage output which forms the output of the accelerometer.

11. The invention as defined in claim 10 wherein said resilient means comprises an arcuately formed sheet of a resilient insulating material.

12. The invention as defined in claim 11 and including means for resiliently urging said variable position capacitor plate toward said fixed position plate.

13. A seismic alarm system comprising:
    means for detecting a seismic tremor;
    means responsive to said detecting means for generating a signal proportional to the magnitude of the tremor;
    means for selectively activating one of at least two alarm means in dependence upon the magnitude of said signal;
    signal conditioning means operatively connected between said responsive generating means and said activating means for attenuating extremely low frequency components of said signal and amplifying said signal while compressing its amplitude range; and
    wherein said signal conditioning means comprises a differential amplifier having two inputs and a differential output and an integrator having an input and an output, said signal from said detecting means being connected to said integrator input and one of said differential amplifier inputs, said integrator output being connected to the other differential amplifier input and said differential amplifier output being connected to said activating means.

14. The invention as defined in claim 13 wherein said selective activating means comprises a microprocessor preprogrammed to compare said signal from said generating means with a predetermined set of wave characteristics and to produce an output signal as a result of said comparison.

15. A seismic alarm system comprising:
    means for detecting a seismic tremor;
    means responsive to said detecting means for generating a signal proportional to the magnitude of the tremor;
    means for selectively activating one of at least two alarm means in dependence upon the magnitude of said signal;
    wherein said signal generating means comprises an oscillator having an output connected to an input of a phase locked loop circuit means, said phase locked loop circuit means having an error voltage output the magnitude of which is dependent upon the frequency deviation of the input signal to the phase locked loop circuit means, and wherein said detecting means comprises means for varying the frequency of the oscillator proportionately with the magnitude of the seismic tremor, and
    wherein the frequency of the oscillator is dependent upon a capacitive value between two nodes in the oscillator and wherein said means for varying the frequency of the oscillator comprises:
    a fixed capacitor plate connected to one of said nodes;
    a variable position capacitor plate connected to the other node;
    an inertia mass secured to said variable position capacitor plate; and
    means for resiliently urging said variable position capacitor plate away from said fixed position capacitor plate.

16. The invention as defined in claim 15 wherein said resilient urging means comprises an arcuately formed sheet of resilient insulating material positioned between and abutting against both of said capacitor plates.

17. The invention as defined in claim 15 and further comprising means for resiliently urging said capacitor plates toward each other whereby said variable position capacitor plate is suspended in a spaced apart and parallel relation with respect to the fixed capacitor plate.

* * * * *